(12) United States Patent
Laurent et al.

(10) Patent No.: US 7,811,702 B2
(45) Date of Patent: Oct. 12, 2010

(54) MICROBATTERY COMPRISING THROUGH-CONNECTIONS AND PRODUCTION METHOD THEREOF

(75) Inventors: Jean-Yves Laurent, Domene (FR); Raphael Salot, Lans En Vercors (FR); Didier Marsacq, Grenoble (FR); Marc Zussy, Grenoble (FR)

(73) Assignee: Commissariat à l'Energie Atomique, Paris (FR)

( * ) Notice: Subject to any disclaimer, the term of this patent is extended or adjusted under 35 U.S.C. 154(b) by 922 days.

(21) Appl. No.: 11/632,546

(22) PCT Filed: Jul. 8, 2005

(86) PCT No.: PCT/FR2005/001771

§ 371 (c)(1),
(2), (4) Date: Jan. 17, 2007

(87) PCT Pub. No.: WO2006/024721

PCT Pub. Date: Mar. 9, 2006

(65) Prior Publication Data

US 2007/0238019 A1    Oct. 11, 2007

(30) Foreign Application Priority Data

Aug. 3, 2004   (FR) .................................. 04 08597

(51) Int. Cl.
*H01M 10/04* (2006.01)
*H01M 10/36* (2006.01)

(52) U.S. Cl. ...................................... 429/162; 429/127

(58) Field of Classification Search .................... None
See application file for complete search history.

(56) References Cited

U.S. PATENT DOCUMENTS

| 5,561,004 A | 10/1996 | Bates et al. |
| 6,168,884 B1 * | 1/2001 | Neudecker et al. ........... 429/162 |
| 6,197,450 B1 | 3/2001 | Nathan et al. |
| 6,632,563 B1 | 10/2003 | Krasnov et al. |
| 6,916,679 B2 * | 7/2005 | Snyder et al. ................. 438/64 |
| 2002/0037756 A1 | 3/2002 | Jacobs et al. |
| 2004/0081860 A1 | 4/2004 | Hundt et al. |

FOREIGN PATENT DOCUMENTS

WO    WO 2005/036689 A2    4/2005

* cited by examiner

*Primary Examiner*—John S Maples
(74) *Attorney, Agent, or Firm*—Oliff & Berridge, PLC

(57) ABSTRACT

A microbattery has a support having a front face, a rear face, first and second current collectors arranged on the front face. A stack including a cathode and an anode separated by an electrolyte is arranged on the current collectors. The anode and cathode respectively contact the first and second current collectors. A protective layer covers the stack. The microbattery has connections in contact with the first and second current collectors, passing through the support from the front face to the rear face. The stack substantially covers of the front face of the support. A method for producing the mircobattery includes etching cavities, in the front face of the support, having a depth that is smaller than the thickness of the support, filing of the cavities with a conducting material and removing a layer of the rear face of the support to uncover the conducting material in the cavities.

9 Claims, 2 Drawing Sheets

MICROBATTERY COMPRISING THROUGH-CONNECTIONS AND PRODUCTION METHOD THEREOF

BACKGROUND OF THE INVENTION

The invention relates to a microbattery comprising
a support having a front face and a rear face,
first and second current collectors arranged on the front face of the support,
a stack comprising an anode and a cathode separated by an electrolyte, the anode and cathode being in contact respectively with the first and second current collectors,
a protective layer covering said stack,
electrical connection means in contact with the first and second current collectors.

STATE OF THE ART

As represented in FIG. 1, microbatteries conventionally comprise a support 1 having a front face 2 and a rear face 3 and whereon a first current collector 4 and a second current collector 5 and a stack comprising an anode 6 and a cathode 8 separated by an electrolyte 7 are arranged. The anode 6 and cathode 8 are in contact respectively with the first 4 and second 5 current collectors. The current collectors 4 and 5 usually comprise contact pads for connecting an external electrical load to the first and second current collectors 4 and 5 and thereby to the anode 6 and cathode 8 of the microbattery. The contact pads are typically arranged on the support 1, on each side of said stack, and are for example formed by extensions of the current collectors 4 and 5. Contact wires are welded to the contact pads to connect the external electrical load. The thickness of the stack can be less than 50 micrometers.

The energy stored in the battery depends essentially on the surface of the electrodes, i.e. of the anode 6 and cathode 8. Reducing the size of the batteries therefore requires the use of very thin layers to achieve the electrodes and the electrolyte. Moreover, when the microbattery is fitted on an integrated circuit chip, the available surface is often very limited.

Several microbatteries can be electrically associated in series or in parallel. In order to minimize the size of a device comprising a plurality of batteries, it is then sought to minimize the size of the contact pads.

Conventionally, fabrication of the batteries comprises coating processes of successive active layers constituting the anode, the electrolyte and the cathode. The anode, cathode and electrolyte being constituted by very reactive materials, the whole battery is usually covered by a protective or coating layer. Only the contact pads do not have to be covered, which is difficult to achieve, especially on a finished device.

OBJECT OF THE INVENTION

One object of the invention is to remedy these shortcomings and in particular to minimize the size of a microbattery and to avoid a localized opening step of the contacts in the final phase of fabrication.

According to the invention, this object is achieved by the appended claims and more particularly by the fact that the electrical connection means comprise connections passing through the support from the front face to the rear face thereof.

It is a further object of the invention to provide a method for producing a microbattery according to the invention successively comprising:

etching, in the front face of the support, of cavities having a smaller depth than the thickness of the support,
filling the cavities with a conducting material designed to constitute the connections passing through the support,
successive deposition, on the front face of the support, of the first and second current collectors, the stack and the protective layer,
removal of a layer of the rear face of the support so as to uncover the conducting material contained in the cavities.

BRIEF DESCRIPTION OF THE DRAWINGS

Other advantages and features will become more clearly apparent from the following description of particular embodiments of the invention given as non-restrictive examples only and represented in the accompanying drawings, in which.

DESCRIPTION OF PARTICULAR EMBODIMENTS

Figure 1:
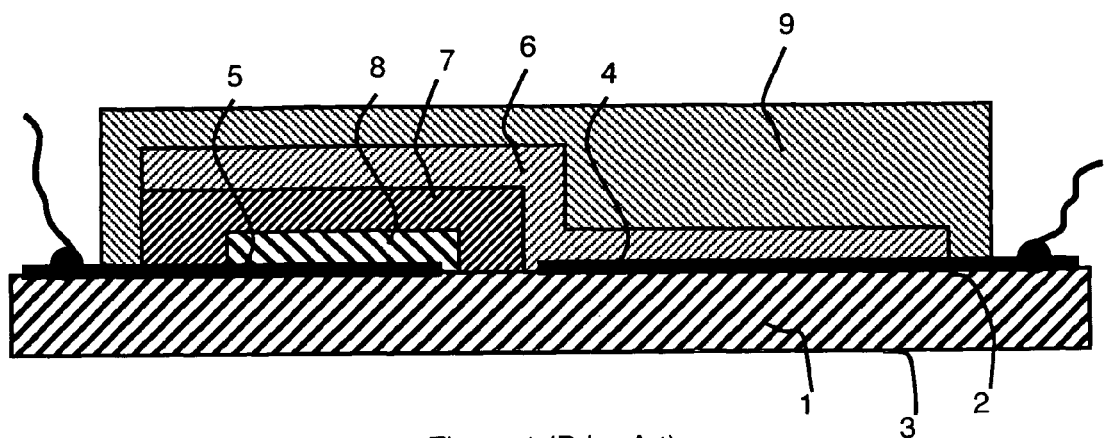
FIG. 1 represents a microbattery according to the prior art.
Figure 2:
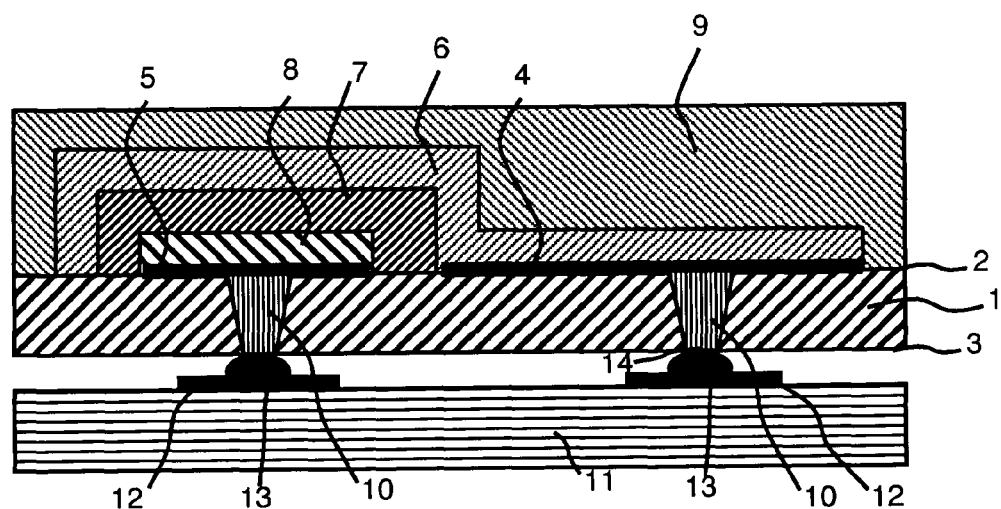
FIG. 2 represents a particular embodiment of a microbattery according to the invention.

The microbattery represented in FIG. 2 comprises a support 1, preferably made from silicon, having a front face 2 and a rear face 3. The silicon support presents the advantage of being compatible with deposition methods based on microelectronics techniques. A first current collector 4 and a second current collector 5 are arranged on the front face 2 of the support 1. A stack comprising a cathode 8 and an anode 6 separated by an electrolyte 7 is arranged on the current collectors 4 and 5. The anode 6 and cathode 8 are respectively in contact with the first current collector 4 and the second current collector 5. A protective layer 9 covers said stack and thereby ensures tight sealing of the microbattery. The first 4 and second 5 current collectors are in contact with connections 10 passing through the support 1 from the front face 2 to the rear face 3 thereof.

In the particular embodiment represented in FIG. 2, the stack covers substantially the whole of the front face 2 of the support 1. Thus, the whole of the front face 2 of the support 1 is used only for the microbattery stack, without any surface losses for possible contact pads. In FIG. 2, the microbattery is arranged on an electric load 11, for example an integrated circuit, comprising contact pads 12. Rear faces 14 of the through-connections 10 are connected to the contact pads 12 of the electric load 11, for example by means of fusible micropellets 13. Thus, the rear faces 14 of the though-connections 10 perform the function of rear connection terminals of the microbattery, on the rear face 3 of the support 1. The contact terminals enable the microbattery to be connected to one or more additional microbatteries, to an electronic chip or to any electric load. Batteries can for example be connected directly to one another, rear face against rear face, in series or in parallel. It can also be envisaged to arrange contact pads on the rear faces 14 of the through-connections 10. The total thickness of the microbattery, the stack and the support 1 included, can be about 0.1 mm.

Figure 3:
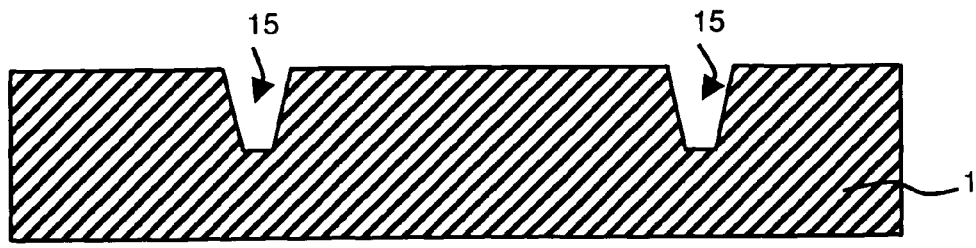
FIGS. 3 to 6 represent different steps of a particular embodiment of a method for producing a microbattery according to the invention.

FIGS. 3 to 6 represent successive steps of a particular method for producing a microbattery according to the invention. As represented in FIG. 3, cavities 15 having a depth that is smaller than the thickness of the support 1 are etched in the front face 2 of the support 1 so as to form non pass-through holes. Etching can be performed by a chemical etching method or by a reactive plasma method. The depth of a cavity 15 is for example 50 micrometers and the thickness of the support 1 is 100 micrometers. In FIG. 3, the cavities 15 taper in the direction of the rear face of the support 1.

Figure 4:
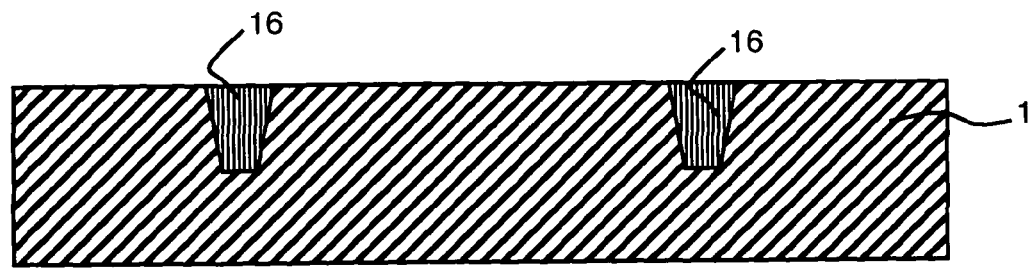

As represented in FIG. 4, the cavities 15 are then filled with a conducting material 16 designed to constitute the connections 10 passing through the support 1. Filling of the cavities 15 with the conducting material 16 is preferably achieved by electrolytic growth, for example of copper. In the particular embodiment represented in FIG. 4, the front face 2 of the support 1 and the conducting material 16 form a common flat surface. To obtain such a common flat surface, an additional planarization step can be performed, in particular when, after the cavities 15 have been filled, the conducting material 16 extends beyond the front face of the support 1.

Figure 5:
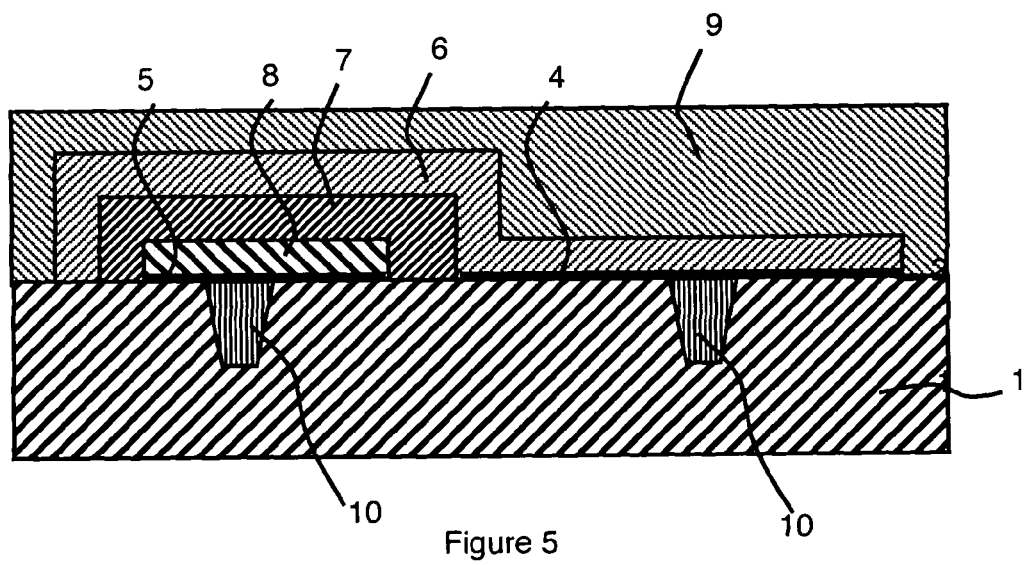

Successive deposition of the first 4 and second 5 current collectors, of the stack and of the protective layer 9, on the front face 2 of the support 1, is represented in FIG. 5. The current collectors and the stack of the microbattery are then built on the conducting material 16 designed to subsequently form the connections passing through the support 1. The conducting material 16 is therefore provisionally enclosed in the cavities 15, between the material of the support 1 and the current collectors 4 and 5, to be uncovered at the end of the method.

The anode 6 is for example achieved by thermal evaporation of lithium and it preferably, has a thickness comprised between 3 and 5 micrometers. The electrolyte 7 can contain a lithium compound such as lithium and phosphorus oxynitride, better known under the name of LiPON. The electrolyte 7 preferably has a thickness comprised between 1 and 2 micrometers. The current collectors 4 and 5 have for example a thickness comprised between 0.2 and 0.5 micrometers. The stack and the current collectors 4 and 5 can also be achieved by a Physical Vapor Deposition (PVD) method or by low-temperature vaporization.

Figure 6:
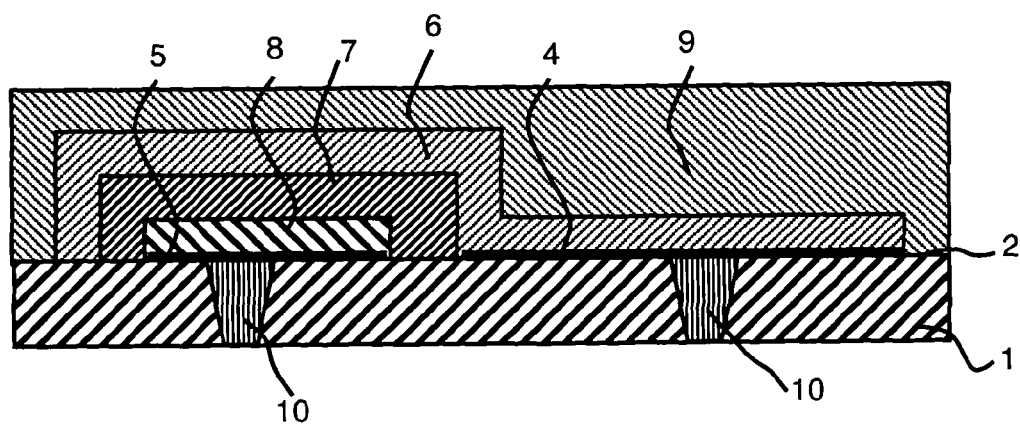

Then, as represented in FIG. 6, a layer of the rear face 3 of the support 1 is removed so as to uncover the conducting material 16 contained in the cavities 15. The support is thus thinned, for example by removing a thickness of 50 micrometers, and the connection terminals of the microbattery are freed making same apparent on the back of the battery. Removal of said layer of the rear face 3 of the support 1 is preferably performed by chemical-mechanical polishing.

The invention is not limited to the particular embodiment described above. In particular, the support 1 can be made of glass, ceramic (zircon, alumina) or polymer (polyether-etherketone PEEK; polyimide).

The invention claimed is:

1. Microbattery comprising
a support having a front face and a rear face,
first and second current collectors, arranged on the front face of the support,
a stack comprising an anode and a cathode separated by an electrolyte, the anode and cathode being in contact respectively with the first and second current collectors,
a protective layer covering the stack, and
electrical connection means in contact with the first and second current collectors and comprising connections that narrow as they pass through the support from the front face to the rear face thereof.

2. The microbattery according to claim 1 comprising connection terminals arranged on the rear face of the support.

3. The microbattery according to claim 1, wherein the stack covers substantially the whole of the front face of the support.

4. The microbattery according to claim 1, wherein the support is made from silicon, glass, ceramic or polymer.

5. The microbattery according to claim 1, where the microbattery has a total thickness from the rear face of the support to an outer edge of the protective layer of about 0.1 mm.

6. A method for producing the microbattery according to claim 1, successively comprising
etching, in the front face of the support, cavities having a depth that is smaller than the thickness of the support,
filling the cavities with a conducting material designed to constitute the connections that narrow as they pass through the support,
successively depositing, on the front face of the support, the first and second current collectors, of the stack and of the protective layer,
removing a layer of the rear face of the support so as to uncover the conducting material contained in the cavities.

7. The method according to claim 6, wherein the etching is performed by a chemical deposition method or by a reactive plasma method.

8. The method according to claim 6, wherein the filling of the cavities with a conducting material is performed by electrolytic growth.

9. The method according to claim 6, wherein the removing the layer of the rear face of the support is achieved by chemical-mechanical polishing.

* * * * *